June 15, 1926.
G. G. MEADE
1,589,200
SPRING RETRACTED SWITCH
Filed Oct. 5, 1921
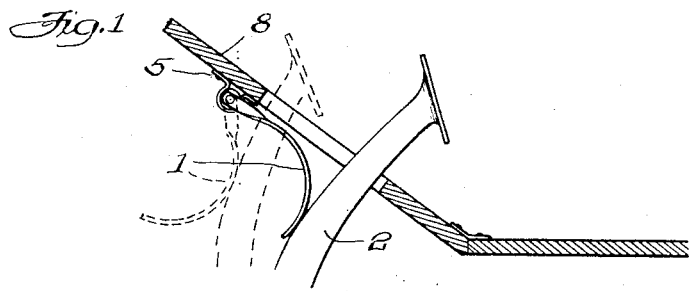
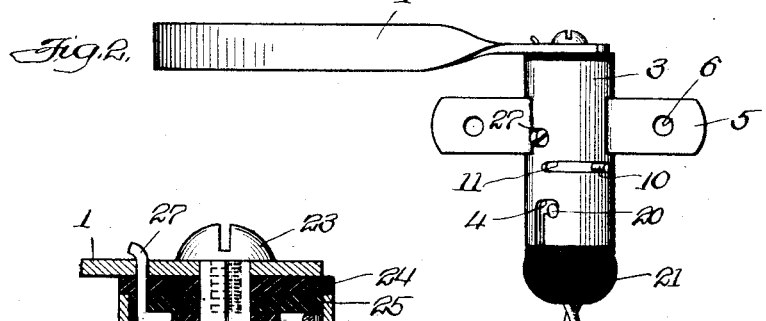
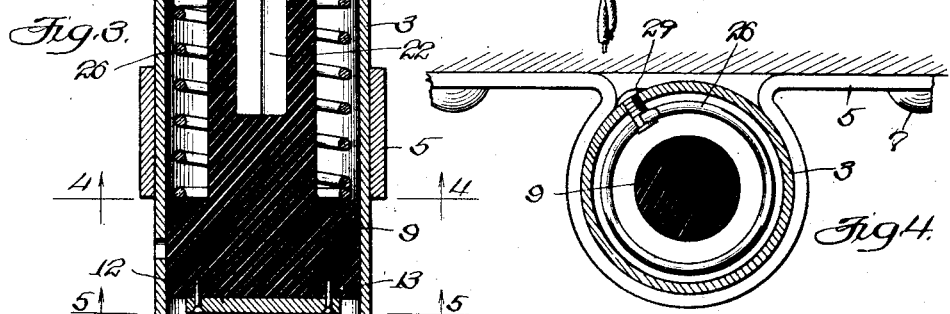
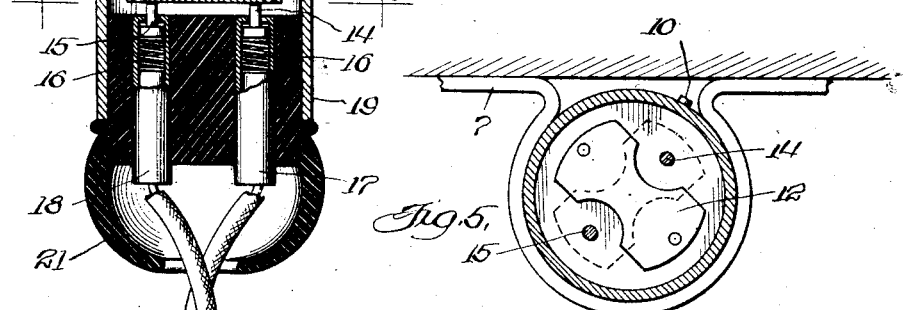
Inventor:
Glen G. Meade Patented June 15, 1926.

1,589,200

UNITED STATES PATENT OFFICE.

GLEN G. MEADE, OF CHICAGO, ILLINOIS, ASSIGNOR, BY MESNE ASSIGNMENTS, TO CHICAGO ELECTRIC MANUFACTURING COMPANY, OF CHICAGO, ILLINOIS, A CORPORATION OF ILLINOIS.

SPRING-RETRACTED SWITCH.

Application filed October 5, 1921. Serial No. 505,478.

My invention relates to circuit-controlling devices and in one of its general aspects aims to provide a simple, compact and easily installed switch which can readily be attached to an automobile in position for direct actuation by the brake lever of the automobile so that the movement of this brake lever in one direction will automatically move the switch to its "on" position. Viewed in this aspect, my invention aims to provide a switching appliance including an actuating lever adapted to be moved by direct engagement with the brake lever and so arranged as to permit relative movement of the two levers in directions substantially longitudinal thereof.

Viewed in another aspect, my invention aims to provide a switching appliance adapted for closing the circuit between two wire terminals carried by an attaching plug of the type commonly employed in automobile lighting practice, and for this purpose aims to provide a switching appliance having a casing arranged for interlocking with a standard type of attaching plug; also, to provide a simple spring-retracted switching member within the casing and to provide a conveniently disposed actuating lever for imparting movement to the switching member. Furthermore, it aims to provide simple means for attaching the casing of such a switching appliance to any convenient support and aims to provide an inexpensive and easily assembled arrangement of the constituent parts. Still further and also more detailed objects will appear from the following specification and from the accompanying drawings, in which—

Fig. 1 is a fragmentary vertical section through the floor of an automobile, showing a switch embodying my invention and installed in operative relation to the braking lever of the vehicle.

Fig. 2 is an enlarged plan view of the same embodiment.

Fig. 3 is a still more enlarged central and longitudinal section through the same embodiment, taken in a plane parallel to that from which Fig. 2 was viewed and showing the switching member in its "on" position.

Fig. 4 is a transverse section taken through Fig. 3 along the correspondingly numbered line of that figure.

Fig. 5 is a transverse section taken along the correspondingly numbered line in Fig. 3 but with the switching member in its normal or "off" position.

In the embodiment of the drawings, my invention is shown as designed for one of its highly commercial uses, namely that of providing a switching adapted for actuation by the brake lever of an automobile, whereby a single circuit will automatically be closed whenever the brake is applied. For this general purpose, it has become customary to equip automobiles with lamps or other electrically operated signals displayed at the rear of the vehicle and to provide switching means adapted to be operated by some portion of the brake-setting mechanism so as to close the circuit to the lamp or other signal whenever the brake is applied. For this purpose I desirably employ an actuating lever 1 disposed in the path of the brake lever 2, and desirably moving in substantially the same plane as the brake lever. To avoid exactness of adjustments and to allow for considerable variation in the extent of movement in the brake lever, I desirably curve the actuating lever 1, as shown for example in Fig. 1, and mount the device so that this curved lever will present its convex surface to the front of the brake lever. By so doing, I cause the brake lever to slide along the engaged face of the actuating lever and to engage the latter with a leverage which decreases continuously as the actuating lever is swung over, thus decreasing the extent to which a prolonged movement of the brake lever swings the actuating lever.

As a mounting for this actuating lever and for the switching means associated therewith, I desirably employ a substantially cylindrical metal casing 3 equipped at its forward end with bayonet slots 4 after the usual manner employed in the construction of sockets and connectors as used on automobile lighting circuits. Then I solder or braze this casing 3 to a strap 5 having screw holes 6 for use with screws 7 in fastening the appliance to a suitable vehicle portion, such as the floor portion 8.

Rotatably mounted within the casing 3 is an insulator 9 which desirably carries a stop pin 10 projecting into a slot 11 extending circumferentially of the casing 3 part way around the latter as shown in Fig. 2. Secured to the forward end of the insulator 9 and extending transversely of the axis of the casing 3 is a contact plate 12, which is here shown as fastened to the insulator 9 by a pair of pins 13. This contact plate 12 is of such a width that it normally is out of contact with the tips of a pair of metal plungers 14, each of which plungers has an enlarged head mounted within a cylinder forming the rear end of one of the wire terminals of the appliance. Thus, Fig. 3 shows the contact plungers 14 and 15 as slidably mounted respectively in the wire terminals 17 and 18, each of the plungers being continuously urged rearwardly of the casing by a spring 16. The wire terminals 17 and 18 are both carried by an insulating plug 19 equipped with the usual lateral pins 20 for interlocking with the bayonet slots 4 of the casing and desirably having a cover portion 21 for concealing the connection of the wires to the terminals 17 and 18.

Thus arranged, it will be evident from Figs. 3 and 5 that by rotating the insulator 9 from its normal position (as shown in full lines in Fig. 4 and in dotted lines in Fig. 5) to the position shown in full lines in Fig. 5, the contact plate 12 will be brought out of contacting relation to the plungers 14 and 15 and hence will open the circuit connection between these two plungers and between the wires connected to the terminals 17 and 18. To effect this movement of the insulator 9, I fasten the latter to the actuating lever 1, desirably by means of a stem 22 having a square shank tightly imbedded in a correspondingly sectioned bore in the insulator and likewise fitting a square hole in the lever 1, the lever being held in place on the shank by a screw 23 threaded into the latter. To afford the proper insulation for the lever 1, which is desirably of metal, I desirably interpose a washer 24 between the lever 1 and the end of the casing 3 and also desirably interpose a smaller washer 25 between the end of the insulator 9 and the said washer 24. This washer 25 desirably has an easily rotating fit within the casing 3 and acts as a head for receiving the end thrust of a spiral spring 26, which spring has its outer end 27 extended through longitudinal bores in the washers 24 and 25 and through a corresponding bore in the lever 1, and which spring has its inner end hooked over a screw 29 threaded into the casing 3. With the parts so arranged, it will be evident from Figs. 3 and 4 with the spring 26 is interlocked at one end and is interlocked with the casing 3 at its other end, thus continuously urging the insulator 9 and the contact plate 12 carried by the latter in one rotational direction, namely towards that shown in full lines in Fig. 5. However, when the lever 1 is moved against the pressure of the spring, or in a clockwise direction in Fig. 1, the insulator 9 will be correspondingly rotated so as to swing the contact plate 12 out of its normal position of Fig. 5 into its circuit-closing position of Fig. 3. As soon as the actuating pressure on the lever 1 is released, as by retracting the brake lever 2, the spring 26 rotates the insulator 9 back to its normal position, thereby turning the current off the lamp or other signal with which the appliance of my invention is employed.

My employing a standard type of two-wire connector plug as part of my appliance, I am able to utilize standard parts as cheaply manufactured in large quantities for other purposes and I also simplify and expedite the installation of the appliance, as the connector plug can readily be connected to the wires before it is interlocked with the casing. Moreover, by simply detaching the terminal-carrying plug from the casing, I can disconnect the signal mechanism at any time when this might be desirable. Likewise, by employing a stop pin 10 projecting into a slot 11 of suitable length, I can limit the retracting movement caused by the spring, so as to stop the contact plate in a desirable "off" position regardless of any excessive retracting movement of the brake lever.

However, while I have illustrated and described my invention in an embodiment employing highly desirable features and have described the same as employed for a certain purpose, I do not wish to be limited to this particular use of the same nor to the details of the construction and arrangement here disclosed, it being obvious that the same might be modified in many ways without departing from the spirit of my invention or from the appended claims.

I claim as my invention:

1. A signal switch for use on an automobile, comprising relatively movable contact members and a spring-retracted actuating lever arranged for relatively moving the said members and disposed in the path of the brake lever of the automobile so as to be moved by engagement with the latter when the brake is applied, the said actuating lever moving in substantially the same plane as the brake lever and presenting a convex surface having different portions thereof successively engageable by the brake lever whereby the leverage of the actuating lever decreases during the actuation thereof by engagement with the brake lever.

2. An electric switch having a rotatable switching member, and an actuating arm extending substantially in a plane transverse of the axis of the switching member and curved to afford a convexed surface adapted to be engaged at a successively changing leverage by an object approaching the said axis in the said plane.

Signed at Chicago, Illinois, September 29th, 1921.

GLEN G. MEADE.